United States Patent
Steffen et al.

(12)

(10) Patent No.: US 12,146,273 B2
(45) Date of Patent: Nov. 19, 2024

(54) SYSTEM AND METHOD FOR DETERMINING PAVING MACHINE PRODUCTIVITY

(71) Applicant: Caterpillar Paving Products Inc., Brooklyn Park, MN (US)

(72) Inventors: Craig M. Steffen, Lamberton, MN (US); Toby A. Frelich, Saint Michael, MN (US); John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 622 days.

(21) Appl. No.: 17/366,656

(22) Filed: Jul. 2, 2021

(65) Prior Publication Data

US 2023/0002981 A1 Jan. 5, 2023

(51) Int. Cl.
| | | |
|---|---|---|
| *E01C 23/01* | (2006.01) | |
| *B60K 35/00* | (2024.01) | |
| *B60K 35/22* | (2024.01) | |
| *B60K 35/28* | (2024.01) | |
| *G01S 17/88* | (2006.01) | |
| *G01S 17/89* | (2020.01) | |

(52) U.S. Cl.
CPC .............. *E01C 23/01* (2013.01); *B60K 35/00* (2013.01); *G01S 17/89* (2013.01); *B60K 35/22* (2024.01); *B60K 35/28* (2024.01); *B60K 2360/178* (2024.01); *G01S 17/88* (2013.01)

(58) Field of Classification Search
CPC ...... E01C 23/01; E01C 19/48; E01C 19/4853; E01C 23/14; B60K 35/00; B60K 2370/152; B60K 2370/178; B60K 2370/166; B60K 2370/171; B60K 2370/61; G01S 17/88; G01S 17/89
See application file for complete search history.

(56) References Cited

U.S. PATENT DOCUMENTS

| | | | |
|---|---|---|---|
| 8,930,092 B2 | 1/2015 | Minich | |
| 9,185,176 B2 | 11/2015 | Nielsen et al. | |
| 10,718,093 B2 | 7/2020 | McAlpine et al. | |
| 2016/0042235 A1* | 2/2016 | Buschmann | G01J 5/0859 |
| | | | 348/148 |
| 2019/0186084 A1* | 6/2019 | Marsolek | E01C 19/48 |
| 2021/0395961 A1* | 12/2021 | Harms | E01C 23/07 |

FOREIGN PATENT DOCUMENTS

| | | |
|---|---|---|
| CN | 206115484 U | 4/2017 |
| EP | 3205773 A1 | 8/2017 |
| WO | WO2018019416 A1 | 2/2018 |
| WO | WO2020144219 A1 | 7/2020 |

* cited by examiner

*Primary Examiner* — Matthew G Marini
*Assistant Examiner* — Leo T Hinze

(57) ABSTRACT

A paving machine includes a plurality of sensor(s) for generating sensor data associated with a paving operation. Criteria associated with paving mat defects are compared against the sensor data to determine whether the criteria is satisfied and whether paving mat defects are predicted. For example, criteria may include whether a hopper of the paving machine is activated, whether a screed assembly of the paving machine is floating, a speed of the paving machine, and whether heat is applied to the screed assembly. In instances where defects are predicted, notifications of such may be provided, or displayed, on a control interface of the paving machine.

20 Claims, 5 Drawing Sheets

SYSTEM AND METHOD FOR DETERMINING PAVING MACHINE PRODUCTIVITY

TECHNICAL FIELD

The present disclosure relates to monitoring a paving machine. More specifically, the present disclosure relates to a monitoring system configured to determine a productivity of the paving machine based at least in part on predicting paving mat defects.

BACKGROUND

A paving machine, such as an asphalt paver, is a self-propelled construction machine designed to receive, convey, distribute, profile, and partially compact paving material. The paving machine accepts heated paving material (e.g., asphalt) into a receiving hopper at a front of the paving machine. The heated asphalt material in the hopper is conveyed to a rear of the paving machine by conveyors positioned at a base of the hopper. The asphalt material is then distributed across a width of the paving machine, for example, using two opposing screws or augers. Finally, a screed assembly located at the rear of the paving machine profiles and compacts the asphalt material into an asphalt surface, which is often referred to as a "mat".

Due to the nature of the paving material, the dynamic nature of the environment in which the mat is formed, and the complexity of the paving machine and other machines in the paving process, it can be difficult to produce a high quality and consistent mat. For example, if a component of the paving machine is malfunctioning, or a setting of the paving machine is incorrect or unsuitable for current environment conditions, the resulting mat may have one or more defects. Extended delays or stoppages of the paving machine during operation can also cause defects in the resulting mat. In some cases, such defects can decrease the longevity and reliability of the paved surface, and can ultimately lead to costly and time-consuming repairs being required.

An example system for controlling a paving process and determining a quality of a paving operation is described in U.S. Pat. No. 8,930,092 (hereinafter referred to as "the '092 reference"). In particular, the '092 reference describes that information is gathered at a paver, and that such information includes paver operating status, asphalt temperature values, screed width and slope, and so forth. The '092 reference describes that a central server aggregates the data, and provides real time actionable production and paving process control in the form of feedback. For example, the '092 reference describes a real time display of the quality metrics to proactively process adjustments, coordination, and control. However, the system described in the '092 reference is not configured to monitor various paving machine configurations, operating parameters, worksite conditions, and other information in order to predict the eventual occurrence of a defect before such a defect occurs. Further, the system described in the '092 reference is not configured to predict an expected type of mat defect corresponding to the gathered information. As a result, while the system described in the '092 reference may be capable of aggregating various machine and operational data, the system is not configured to assist an operator with operating a paving machine in a way that reduces the likelihood of a mat defect being created.

Example embodiments of the present disclosure are directed toward overcoming the deficiencies described above.

SUMMARY

In an aspect of the present disclosure, a method, comprising: receiving sensor data associated with preparing a paving mat; determining, based at least in part on paving defect prediction criteria associated with preparing paving mats, first criteria associated with a first type of paving mat defect; determining, based at least in part on the paving defect prediction criteria, second criteria associated with a second type of paving mat defect different from the first type of paving mat defect; determining, based at least in part on the sensor data, whether the first criteria associated with the first type of paving mat defect is satisfied; determining, based at least in part on the sensor data, whether the second criteria associated with the second type of paving mat defect is satisfied; determining, based at least in part on whether the first criteria is satisfied or whether the second criteria is satisfied, that at least one of the first type of paving mat defect or the second type of paving mat defect is present in the paving mat; generating a notification indicating the at least one of the first type of paving mat defect or the second type of paving mat defect; and causing the notification to be displayed.

In another aspect of the present disclosure, a system, comprising: one or more sensing devices; and a system controller in communication with a controller of the sensing device, the system controller being configured to: receive, from the one or more sensing devices, sensor data associated with a paving operation; determine criteria associated with a paving mat defect during the paving operation, the criteria including a first speed of a machine performing the paving operation, and a first paving material feed status of paving material at the machine; determine, based at least in part on the sensor data, a second speed of the machine and a second paving material feed status; determine that the second speed satisfies the first speed; determine that the second paving material feed status is the same as the first paving material feed status; and determine, based at least in part on the second speed satisfying the first speed and the second paving material feed status being the same as the first paving material feed status, that the criteria is satisfied.

In yet another aspect of the present disclosure, A method, comprising: receiving, from a first sensor of a paving machine, first sensor data; receiving, from a second sensor of the paving machine, second sensor data; determining criteria of a paving mat defect associated with a paving mat prepared by the paving machine; determining, based at least in part on the first sensor data, whether a first portion of the criteria is satisfied; determining, based at least in part on the second sensor data, whether a second portion of the criteria is satisfied, the second portion being different than the first portion; and determining that the paving mat contains the paving mat defect based at least in part on the first portion of the criteria being satisfied and the second portion of the criteria being satisfied.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The devices, apparatuses, and systems depicted in the accompanying figures are not to scale and components within the figures may be depicted not to scale with each other.

DETAILED DESCRIPTION

Figure 1:
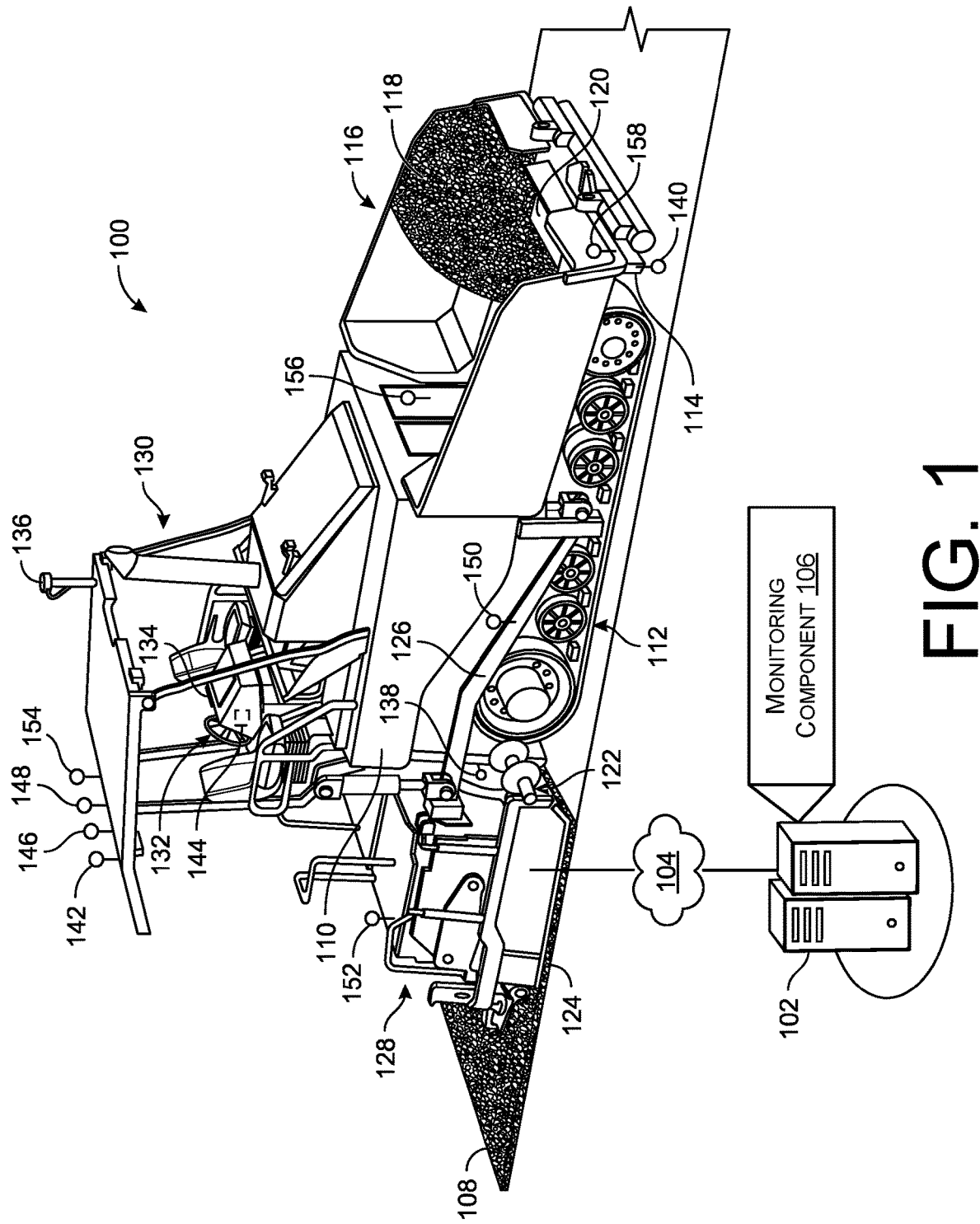
FIG. 1 is a perspective view of a paving machine in communication with a monitoring component, in accordance with an example of the present disclosure.

FIG. 1 shows a paving machine 100 which is used, for example, to deposit asphalt, concrete, or other materials on a work surface associated with a worksite. As shown in FIG. 1, the paving machine 100 is in communication with one or more computing device(s) 102 via a network 104. The one or more computing device(s) 102 include a monitoring component 106 configured to determine and/or predict defects in a paving mat 108 and generate indications associated with the defects. Additional details of the monitoring component 106 are discussed herein with regard to FIG. 2. However, generally, the monitoring component 106 receives sensor data generated by a plurality of sensor(s) of the paving machine 100 for use in predicting defects within the paving mat 108. In some instances, the one or more computing device(s) 102 are configured to determine commands that, when executed by the paving machine 100, a crew member at a worksite with the paving machine 100, and so forth, at least partially remedy the defect. While the following detailed description describes examples in connection with the paving machine 100, it should be appreciated that the description applies equally to the use of the present disclosure in other machines as well.

The paving machine 100 includes a tractor portion 110 supported on a set of ground-engaging elements 112. The tractor portion 110 includes a tractor frame 114, as well as a power source for driving the ground-engaging elements 112. Although the ground-engaging elements 112 are illustrated as continuous tracks, it is contemplated that the ground-engaging elements 112 may be any other type of ground engaging elements as well, such as wheels. In some instances, the power source is an internal combustion engine operating on fossil or hybrid fuels, or in other instances is an electrically operated drive powered by alternate energy sources.

The paving machine 100 includes a hopper 116 for storing paving material 118. The paving machine 100 also includes a conveyor system 120 for conveying the paving material 118 from the hopper 116 to other downstream components of the paving machine 100. For example, the paving machine 100 includes an auger assembly 122 which receives the paving material 118 supplied via the conveyor system 120, and which distributes the paving material 118 on a ground surface 124. In some instances, the auger assembly 122 includes at least one main auger. In some instances, the auger assembly 122 includes a main auger, and an auger extension coupled to the main auger via an auger bearing or other coupling component. Additionally, in some instances, the auger assembly 122 includes a main auger and an additional auger disposed opposite the main auger. In such examples, the main auger and the additional auger are configured to distribute the paving material 118 across substantially an entire width of the paving machine 100. The auger assembly 122 may also include a chamber for receiving the paving material 118 via the conveyor system 120 for distribution by the auger(s).

The paving machine 100 is shown including a tow arm 126 which couples a height adjustable screed assembly 128 to the tractor portion 110 so as to spread and compact the paving material 118 into the paving mat 108 on the ground surface 124. The tow arm 126 is actuated by a hydraulic actuator, an electric actuator (not shown), and/or any other type of actuator as per application requirements. During a finishing pull, the tractor portion 110 pulls the screed assembly 128 to spread the paving material 118. During a finishing pull, the hopper 116 may or may not be activated to funnel the paving material 118 to the conveyor system 120.

An operator station 130 couples to the tractor portion 110. The operator station 130 in FIG. 1 includes a console 132 and other levers or controls (not shown) for operating the paving machine 100. For example, the console 132 includes a control interface 134 for controlling various functions of the paving machine 100. The control interface 134 represents an analog, digital, and/or touchscreen display, and displays, for example, predicted defects in the paving mat 108 as determined by the monitoring component 106. The control interface 134 may also display indications (e.g., map) of the predicted defects, or determined defects, in the paving mat 108. However, the control interface 134 additionally, or alternatively, is configured to display commands that when executed by the paving machine 100, remedy defects of paving mat 108. The control interface 134 supports other functions as well, including for example, sharing various operating data with one or more other machines (not shown) operating in conjunction with the paving machine 100.

The paving machine 100 is shown including a communication device 136 which, in some instances, couples to a roof of the operator station 130. The communication device 136 is capable of determining a location of the paving machine 100, and includes a component of a global positioning system (GPS). For example, the communication device 136 may comprise a GPS receiver, transmitter, transceiver, and/or other such device, and the communication device 136 is in communication with one or more GPS satellites (not shown) to determine a location of the paving machine 100 continuously, substantially continuously, or at various time intervals. Alternatively or additionally, in some instances the communication device 136 communicates with a ground-based location station, virtual reference station (VRS), global navigation satellite system, or other survey coordinate system to determine the location of the paving machine 100. In examples, the communication device 136 also enables the paving machine 100 to communicate with the one or more other machines, and/or with one or more remote servers, processors, or control systems located remote from the worksite at which the paving machine 100 is being used, such as the computing device(s) 102 that include the monitoring component 106.

The paving machine 100 includes one or more temperature sensors 138, 140, and 142. The temperature sensors 138, 140, and 142 comprise mechanical, electrical, electro-mechanical, electronic, infrared, or any other type of a temperature sensor known in the art. In some examples, one or more of the temperature sensors 138, 140, and 142 include an air purge device or other such device (not shown) to prevent debris from forming on the temperature sensor. In such instances, the air purge device receives purged air from an air source storing pressurized air to prevent any dirt, debris, etc. which sticks to the temperature sensors 138, 140, and 142.

The temperature sensors 138, 140, and 142 provide signals (e.g., data) to the monitoring component 106 for use in predicting defects in the paving mat 108. In some instances, the paving machine 100 includes a controller 144 that receives the signals from the temperature sensors 138, 140, and 142 and transmits the signals to the computing device(s) 102, and ultimately, the monitoring component 106. Although shown as residing at the computing device(s) 102, the monitoring component 106 may additionally or alternatively be located onboard the paving machine 100.

In some instances, the temperature sensor 138 couples to the paving machine 100 proximate the auger assembly 122. The temperature sensor 138 is configured to sense, measure, detect, and/or otherwise determine temperatures of the paving material 118 at the auger assembly 122. In some instances, more than one temperature sensor 138 is positioned proximate to the auger assembly 122. For example, multiple temperature sensors may be positioned on opposing sides of the paving machine 100, such as a first lateral side and a second lateral side, for determining a temperature of the paving material 118 at the auger assembly 122, or at various portions of the auger assembly 122. However, although the temperature sensor 138 is shown residing at a particular location in FIG. 1, in other instances, the temperature sensor 138 is positioned elsewhere on or within the paving machine 100 for determining a temperature of the paving material 118 (e.g., within the hopper 116).

As shown in FIG. 1, the temperature sensor 140 is positioned on the tractor frame 114, the hopper 116, and/or at any other location on the paving machine 100 convenient for determining a temperature of the ground surface 124. For example, as shown, the temperature sensor 140 is positioned on the tractor frame 114 proximate the ground-engaging elements 112, and/or at any other location convenient for determining a ground temperature. The temperature sensor 140 is configured to generate a signal including information indicative of the ground temperature.

The temperature sensor 142 is shown positioned on the operator station 130 (e.g., roof), the tractor portion 110, and/or at any other location on the paving machine 100 convenient for determining an ambient temperature at the worksite in which the paving machine 100 resides. In some instances, the temperature sensor 142 measures an ambient pressure and/or other parameters at the worksite. The temperature sensor 142 generates a signal including information indicative of ambient conditions such as ambient temperature, pressure, etc.

The paving machine 100 includes additional temperature sensors not shown and discussed in FIG. 1. For example, a temperature sensor is positioned measure a temperature of hydraulic oil within the paving machine 100, or within components of the paving machine 100 (e.g., actuators for the screed assembly, pumps, etc.). One or more temperature sensors may also measure engine temperature. Additionally, the paving machine 100 includes a temperature sensor to measure a temperature of the paving material 118 at the screed assembly 128. In some instances, a sensor is disposed to measure whether the screed assembly 128 is heating the paving material 118. As discussed herein, the temperature sensors are used to measure a temperature of the paving material 118, the ground surface 124, and so forth for predicting paving mat defects (e.g., too cold, too hot, etc.)

The paving machine 100 includes a LIDAR sensor 146 and/or a RADAR sensor 148. While depicted as residing on a roof of the operator station 130, in other examples, the LIDAR sensor 146 and/or the RADAR sensor 148 are positioned at any location on the paving machine 100, or another location proximate the paving machine 100 at which the sensors capture sensor data of the paving mat 108. Additionally, while one LIDAR sensor 146 and one RADAR sensor 148 are shown, any number of LIDAR sensors and/or RADAR sensors may be incorporated into and/or proximate the paving machine 100. In examples, the LIDAR sensor 146 measures distance to a target (e.g., the paving mat 108) by illuminating the target with laser light and measuring the reflected light with a sensor. The LIDAR sensor 146 uses differences in laser return times and wavelengths to make digital 3D representations of the target. For instance, the LIDAR sensor 146 generates a signal including information indicative of a 3D representation of the target.

Additionally, in some instances, the RADAR sensor 148 uses radio waves to determine the range, angle, or velocity of a target (e.g., the paving mat 108). The RADAR sensor 148 generates a signal that includes information such as range, angle, and/or velocity of the target. It is contemplated that the paving machine 100 includes various other sensors to measure various other parameters related to the paving machine 100, the paving mat 108, and/or the worksite. The LIDAR sensor 146 and/or the RADAR sensor 148 provide the respective signals (e.g., by way of the controller 144) including information indicative of the environment of the worksite to the monitoring component 106.

The paving machine 100 includes a screed float sensor 150 positioned on the tow arm 126. The screed float sensor 150 detects whether the screed assembly 128 is "floating" relative to the paving machine 100. For example, in some instances, a height of the screed assembly 128 above the ground surface 124 is set in position (e.g., bonded), whereas in other instances, the height of the screed assembly 128 above the ground surface may be free to float up and down on the ground surface 124. As the paving machine 100 traverses over the ground surface 124, the screed assembly 128 vertically translates to climb higher through a pile of the paving material 118 to increase the amount of paving material 118 extruded behind the screed assembly 128. Conversely, vertically lowering the screed assembly 128 will reduce the amount of paving material 118 extruded. As such, in instances where the screed assembly 128 floats, the paving machine 100 may traverse uneven grounds while the screed assembly 128 floats over the paving material 118, leading to a smooth paving mat 108. The screed float sensor 150 may be located elsewhere on the paving machine 100, such as the screed assembly 128. Moreover, in some instances, the screed float sensor 150 represents a switch of the paving machine that provides an indication of whether the screed assembly 128 is floating or not (e.g., control circuitry).

A screed height sensor 152 measures a height of the screed assembly 128 above the ground surface 124. In some instances, the screed height sensor 152 comprises a LIDAR sensor, a RADAR sensor, and the like that emits signals (e.g., light, sound, audio) toward the ground surface 124 and measures a return time for determining the height (or distance) of the screed assembly 128. In some instances, the screed height sensor 152 is incorporated within the screed float sensor 150, vice versa.

The paving machine 100 furthers include a plurality of additional sensors. For example, a speed sensor 154 measures a speed of the paving machine 100 at the worksite, or across the ground surface 124. In some instances the speed sensor 154 measures a ground speed of the paving machine 100. The speed sensor 154 may include a wheel encoder (e.g., via the ground-engaging elements 112), tachometer, radar, LIDAR, or any other type of sensor for measuring speed. In some instances, the speed of the paving machine 100 may be determined via the communication device 136. The speed of the paving machine 100 may also be determined via optical or magnetic sensors disposed in the engine or the transmission of the paving machine 100.

The paving machine 100 includes a material feed sensor 156 for determining whether the paving material 118 is being conveyed. For example, the material feed sensor 156 measures, or may be used to determine, whether the conveyor system 120 is actuated for conveying the paving material 118 from the hopper 116 to the auger assembly 122. In some instances, the material feed sensor 156 measures whether the paving material 118 is being supplied manually (e.g., whether the conveyor system 120 is being manually actuated), automatically (e.g., the conveyor system 120 automatically conveys the paving material 118 based on conditions, such as weight), and/or whether the conveyor system 120 is powered off. In some instances, the material feed sensor 156 includes a mechanical paddle-type, a sonic sensor, or other type of sensor. In examples, the material feed sensor 156 generates a signal that indicates a distance of the material feed sensor 156 from the paving material 118 at an outboard end of an auger of the auger assembly 122.

In some instances, a material feed status of the paving machine 100 may be determined using a state of feeder pumps. For example, the paving machine 100 may include feeder pumps that supply liquids (e.g., oil, tar, etc.) during the paving operation. If the feeder pumps are off, the material feed status may be off, whereas if the feeder pumps are on, the material feed status may be autonomous. The feeder pumps may also be in manual mode for knowing whether the material feed status is manual.

A hopper activation sensor 158 measures whether the hopper 116 is activated (e.g., activating sides of the hopper 116 to funnel the paving material 118 to the conveyor system 120). Further, sensor(s) measure whether the engine is powered on or powered off, whether a key or ignition switch is activated or deactivated, and/or a propel mode of the paving machine 100, such as whether the paving machine 100 is maneuvering, whether the paving machine 100 is depositing the paving material 118 (e.g., paving), and so forth. Additionally, the paving machine 100 includes camera(s) that image the paving mat 108 and/or an environment at the worksite.

As introduced above, the paving machine 100 includes the controller 144. The controller 144 is in communication with the control interface 134, the communication device 136, the temperature sensors 138, 140, 142, the LIDAR sensor 146, the RADAR sensor 148, the screed float sensor 150, the screed height sensor 152, a temperature sensor that measure hydraulic oil temperature, a temperature sensor that measures a temperature of the paving material 118 at the screed assembly 128, sensor(s) that measure whether the engine is powered on or powered off, sensor(s) that measure whether a key or ignition switch is activated or deactivated, sensor(s) that measure a propel mode of the paving machine 100, sensor(s) that measure whether the conveyor system 120 is activated, sensor(s) that measure whether the hopper 116 is activated, sensor(s) that measure a speed of the paving machine 100, and/or other sensors of the paving machine 100.

The controller 144 may be a single controller or multiple controllers working together to perform a variety of tasks. In examples, the controller 144 embodies a single or multiple microprocessors, field programmable gate arrays (FPGAs), digital signal processors (DSPs), and/or other components configured to predict and/or otherwise determine possible defects in the paving mat 108 based on one or more signals received from the sensor(s) and/or components (e.g., engine) of the paving machine 100. As such, the sensor(s) provide data to the controller 144 for use in predicting defects in the paving mat 108. Numerous commercially available microprocessors may be configured to perform the functions of the controller 144. Various circuits are associated with the controller 144, including power supply circuitry, signal-conditioning circuitry, actuator driver circuitry (i.e., circuitry powering solenoids, motors, or piezo actuators), and communication circuitry. In some examples, the controller 144 is positioned on the paving machine 100, while in other examples the controller 144 is positioned at an off-board location and/or remote location relative to the paving machine 100. The present disclosure, in any manner, is not restricted to the type of controller 144 or the positioning of the controller 144 relative to the paving machine 100.

In some instances, the paving machine 100 includes one or more modules, such as an engine module, machine module, or a transmission module for determining the operational statuses of the various components of the paving machine 100. The modules control various circuitry of the paving machine 100 which causes various components of the paving machine 100 to activate, deactivate, or operate according to certain parameters. For example, the modules control whether the hopper 116 is activated, whether the screed heat is on, whether the screed assembly 128 is floating, and so forth. As such, the modules are utilized to determine the statuses of various components of the paving machine 100, such as whether the components are activated or a certain state of activation.

The paving machine 100 therefore includes a plurality of sensors for generating data associated with a paving operation. For example, the sensor(s) may determine configurations of the paving machine 100, operational parameters of the paving machine 100 (e.g., hopper activated, screed heat on, etc.), and/or worksite conditions. The sensor data may be transmitted to the computing device(s) 102 for use in predicting defects within the paving mat 108. The computing device(s) 102 include the monitoring component 106 that receives the sensor data generated by the sensor(s) for use in predicting the paving mat defects. For example, the monitoring component 106 determines a mat defect probability based on the configurations of the paving machine 100, the operational parameters, and worksite conditions.

Figure 2:
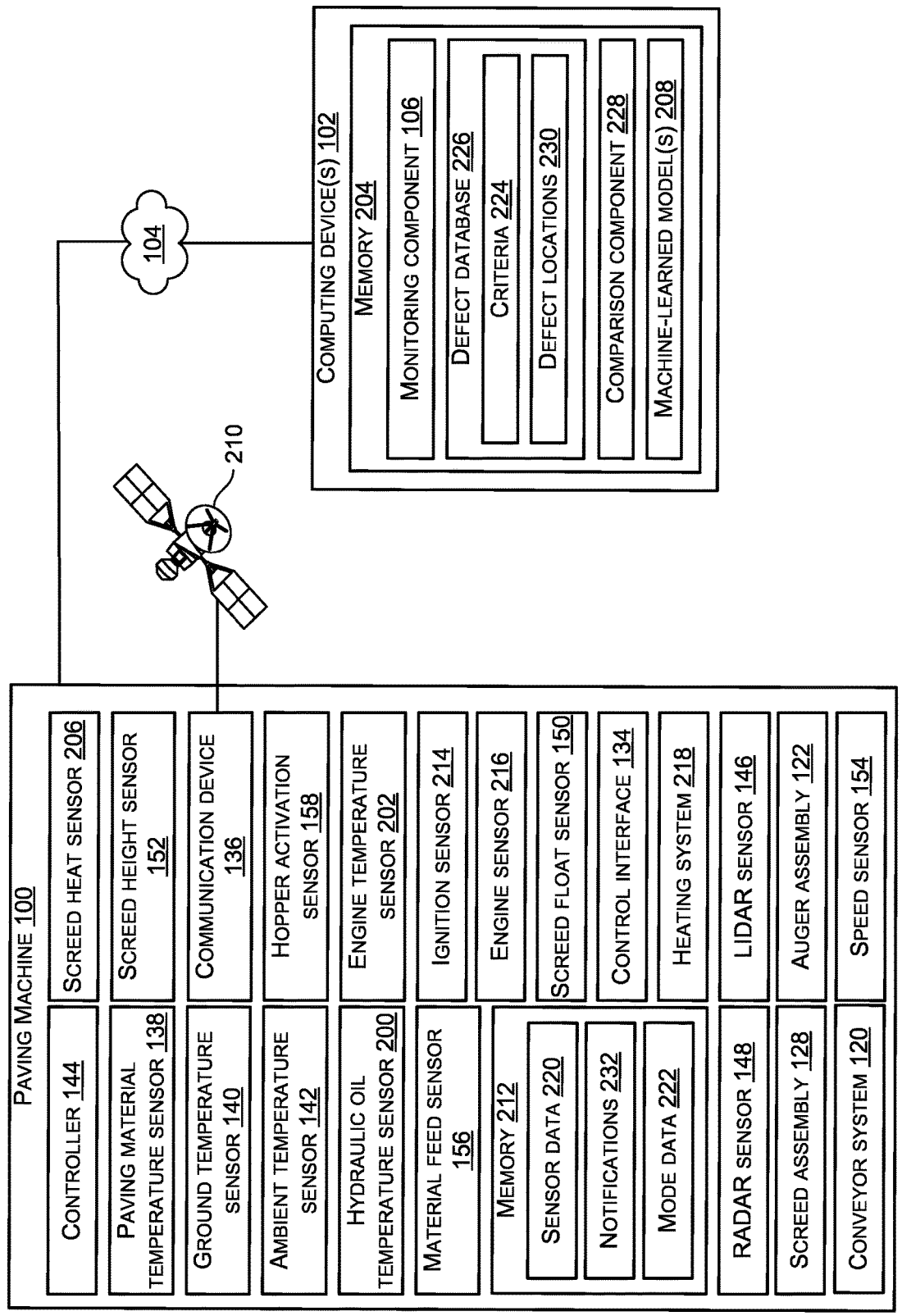
FIG. 2 is a block diagram that illustrates example components of a paving machine and computing device(s), in accordance with an example of the present disclosure.

FIG. 2 illustrates example components of the paving machine 100 and the computing device(s) 102. As introduced above in FIG. 1, the paving machine 100 includes a plurality of sensor(s) that generate sensor data for use in predicting defects of the paving mat 108. For example, the paving machine 100 includes a plurality of temperature sensor(s) disposed across, within, or on the paving machine 100. In some instances, the temperature sensor(s) include the paving material temperature sensor 138 (e.g., the temperature sensor 138) that measures a temperature of the paving material 118 at the auger assembly 122, the ground temperature sensor 140 (e.g., the temperature sensor 140) that measures a temperature of the ground surface 124, the ambient temperature sensor 142 (e.g., the temperature sensor 142) that measures an ambient temperature at a worksite associated with the paving machine 100, a hydraulic oil temperature sensor 200 that measures a temperature of hydraulic fluid within the paving machine 100, or within components of the paving machine 100 (e.g., hydraulic actuators, lines, pumps, etc.), and/or an engine temperature sensor 202 that measures a temperature of an engine of the paving machine 100. The various temperature sensor(s) include, for example, thermocouples, resistance temperature detectors (RTDs), thermistors, or semiconductor based integrated circuits (IC).

The paving machine 100 further includes the LIDAR sensor 146 and the RADAR sensor 148. The LIDAR sensor 146 measures a distance to a target (e.g., the paving mat 108) by illuminating the target with laser light and measuring the reflected light with a sensor. The RADAR sensor 148 uses radio waves to determine the range, angle, or velocity of a target (e.g., the paving mat 108).

The paving machine 100 includes the screed float sensor 150 that measures whether the screed assembly 128 is floating, or is free to float. In some instances, whether the screed assembly 128 is floating may be based on switches (e.g., circuitry) of the paving machine 100 being activated and/or whether the screed assembly 128 is bonded, locked, or otherwise fixed in position. In such instances, the screed assembly 128 may be fixed in height. For example, an operator of the paving machine 100 may actuate switches that function or control the screed assembly 128 to float. In such instances, an indication of such is used to determine that the screed assembly 128 is floating.

The speed sensor 154 measures a ground speed of the paving machine 100 at the worksite. The material feed sensor 156 is included to measure whether the conveyor system 120 is supplying paving material 118 to the auger assembly 122. In some instances, the material feed sensor 156 provides indications of whether the conveyor system 120 is operational or non-operational. When operational, the conveyor system 120 conveys the paving material 118 from the hopper 116 to the auger assembly 122, whether autonomously or manually. For example, the conveyor system 120 may autonomously convey the paving material 118 according to a certain rate, based on a speed of the paving machine 100, a width or depth of the paving mat 108, a temperature of the paving material 118, and so forth. Here, the conveyor system 120 autonomously provides the paving material 118 based on sensed conditions at the worksite (e.g., speed, temperature, screed height, etc.). Comparatively, an operator of the paving machine 100 may manually control the conveyor system 120 for providing the paving material 118 to the auger assembly 122 (e.g., via the control interface 134). By way of example, the operator may adjust a speed of the conveyor system 120 to increase or decrease the amount of paving material 118 conveyed to the auger assembly 122. In instances where the conveyor system 120 is non-operational, the conveyor system 120 is powered down so as to not supply the paving material 118 to the auger assembly 122.

In some instances, the material feed sensor 156 communicatively couples to motors of the conveyor system 120 for determining whether the conveyor system 120 is supplying the paving material 118. The material feed sensor 156 may also represent an ultrasonic sensor that measures the supply of the paving material 118. Additionally, or alternatively, the material feed sensor 156 generates information indicative of an operational state of the conveyor system 120, or components controlling the conveyor system 120, such as whether the conveyor system 120 is controlled to autonomously provide the paving material 118, manually provide the paving material 118, or is powered down. The material feed sensor 156 may include a mechanical paddle-type, a sonic sensor, a LIDAR sensor, a RADAR sensor, an imaging device, or other type of sensor. In some instances, the material feed sensor 156 generates a signal that indicates a distance of the material feed sensor 156 from the paving material 118, which indicates whether the paving material 118 is being supplied.

A screed heat sensor 206 measures whether the screed assembly 128 is heating the paving material 118. In some instances, the screed heat sensor 206 represents a temperature sensor, or a switch that determines whether heating elements within the screed assembly 128 are heating the paving material 118. For example, the paving machine 100 may include a heating system 218 coupled to, thermally connected to, and/or otherwise associated with the screed assembly 128. The heating system 218 includes, for example, one or more electronic heat plates, heat coils, or other components configured to increase the temperature of the screed assembly 128 (or a screed plate) to a desired operating temperature. In some instances, the heating system 218 includes an electronic heat plate operably connected to a battery, generator, and/or other source of electronic power. In such instances, the electronic heat plate is activated by directing electronic power thereto, and the heat plate is controlled to obtain and/or maintain a desired temperature during operation. Controlling the heat plate and/or other components of the heating system 218 in this manner causes a commensurate increase in a temperature of the screed assembly 128, and maintains a desired temperature during operation.

A hopper activation sensor 158 measure whether the hopper 116 of the paving machine 100 is activated. For example, as a haul truck deposits the paving material 118 into the hopper 116, the hopper 116 may be deactivated. In the deactivated state, the hopper 116 includes a width that is substantially equal to the width of the haul truck depositing the paving material 118. However, as the paving material 118 is supplied by the conveyor system 120 to the auger assembly 122, the amount of the paving material 118 in the hopper 116 lessens. At this point, to channel the paving material 118 towards or into the conveyor system 120, sides of the hopper 116 tip or fold inwards, towards the conveyor system 120. This causes the paving material 118 to fall towards the conveyor system 120, thereby allowing the paving material 118 to be conveyed to the auger assembly 122. In some instances, the hopper activation sensor 158 communicatively couples to actuators of the hopper 116 for measuring whether the actuators are extended (e.g., hopper activated) or retracted (e.g., hopper deactivated). For example, the hopper activation sensor 158 may represent a displacement sensor (e.g., radar, LIDAR, photoemitter, proximity sensor, etc.) that detects whether actuators of the hopper 116 are displaced.

The paving machine 100 includes an ignition sensor 214 that measures whether an ignition of the paving machine 100 is powered on or powered off. In some instances, the ignition sensor 214 measures "key on" and "key off" events (e.g., whether a key of the paving machine 100 is turned "on" or "off"). An engine sensor 216 serves to measure whether an engine of the paving machine 100 is powered on or powered off. The communication device 136 measures a location of the paving machine 100. The communication device 136 is connected to and/or otherwise in communication with one or more satellites 210 or other GPS components configured to assist the communication device 136 in determining the location of the paving machine 100.

The controller 144 is configured to receive respective signals from the sensor(s). For example, the controller 144 receives one or more signals from the communication device 136 including information indicating a location of the paving machine 100, one or more signals from the hopper activation sensor 158 indicating an activation of the hopper 116, one or more signals from the material feed sensor 156 indicating an operational status of the conveyor system 120 (e.g., auto feed, manual feed, off), one or more signals from screed heat sensor 206 indicating whether the heating system 218 is heating the paving material 118, and so forth. The paving machine 100 stores various information received from the sensor(s) within memory 212. For example, the memory 212 is shown storing or having access to sensor data 220, which is generated by the various sensor(s) of the paving machine 100. The sensor data 220, as discussed herein, is usable to determine defects in the paving mat 108. That is, the sensor data 220 generated by the various sensor(s) of the paving machine 100, or components thereof, is usable to determine defects in the paving mat 108. For example, the sensor data 220 may indicate a status of the paving machine 100 (e.g., configurations), or a status of components of the paving machine 100, operational parameters of the paving machine 100 (e.g., material feed), and/or worksite conditions (e.g., temperature).

The memory 212 is further shown storing or having access to mode data 222, which in some instances, indicates a mode of the paving machine 100. Modes include, for example, paving, maneuvering, or traveling. Paving indicates that the paving machine 100 is paving by depositing the paving material 118. Maneuvering mode allows the paving machine 100 to counter-rotate (e.g., for a track machine) or turn sharper (e.g., for a wheeled machine). During maneuvering, the conveyor system 120 (as well as screed vibrational systems) are disabled. The maneuvering mode may be useful when moving around a job site when not paving, when the paving machine 100 backs up, or maneuvers into tight spaces to start paving. Travel mode allows the paving machine 100 to travel at higher ground speeds, and also disables functions of the paving machine 100 other than drive and steering. Travel mode may be utilized when going back to the start of the paving mat 108 for a second pass on a long paving pass, or sometimes traveling to another job site. In some instances, the modes are associated with a propulsion of the paving machine (e.g., via the ground-engaging elements 112) or a status of a transmission (e.g., in gear, parked, etc.).

The computing device(s) 102 comprise, for example, one or more servers, laptop computers, or other computers located at a paving material plant remote from the worksite at which the paving machine 100 is being used. In such examples, the communication device 136 is connected to and/or otherwise in communication with the computing device(s) 102 via the network 104. The network 104 may be a local area network ("LAN"), a larger network such as a wide area network ("WAN"), or a collection of networks, such as the Internet. Protocols for network communication, such as TCP/IP, may be used to implement the network 104. Although embodiments are described herein as using a network such as the Internet, other distribution techniques may be implemented that transmit information via memory cards, flash memory, or other portable memory devices. However, the paving machine 100 additionally or alternatively communicatively couple to additional electronic devices such as tablets, mobile phones, laptop computers, and/or other mobile devices. Such mobile devices are located at the worksite or, alternatively, one or more such mobile devices are located at the paving material plant described above, or at another location remote from the worksite. In such instances, the communication device 136 is connected to and/or otherwise in communication with such mobile devices via the network 104. In any of the examples described herein, the sensor data 220, and/or any other information received, processed, or generated by the controller 144 is provided to the computing device(s) 102 and/or the mobile devices via the network 104.

The controller 144 provides the sensor data 220 to the monitoring component 106. The monitoring component 106 is configured to identify mat defects from the sensor data 220, and map the sensor data 220 to criteria 224 stored in a defect database 226. The defect database 226 indicates the possible types of defects at the worksite, or on the paving mat 108, and the criteria 224 is associated with conditions that cause the types of defects. For example, different operating conditions at the worksite or different paving machine 100 parameters lead to different types of defects in the paving mat 108. Stated alternatively, different configurations, operating parameters, and/or conditions cause defects in the paving mat 108. For example, different settings of the paving machine 100, such as the activation of certain components (e.g., the hopper 116), lead to different types of defects. The types of defects are characterized or classified for use in training purposes. For example, depending on the types of defects, operators of the paving machine 100 are trained to avoid doing those actions that cause particular types of mat defects.

In some instances, the types of mat defects include, for example, (1) a waiting mat defect, (2) an auger chamber fill mat defect, (3) a paving finishing pull mat defect, (4) a material feed manual override while paving mat defect, and (5) a hopper activation mat defect. In some instances, each of the aforementioned defects are associated with respective criteria 224 that leads to paving mat defects. In some instances, more than one of the criteria 224 associated with the paving mat defects is satisfied at the same time and/or at the same location. That is, more than one paving mat defect may be predicted. Moreover, each of the aforementioned defects may include multiple subcategories, for further defining the defect or operating parameters that lead to the defect. The monitoring component 106 is configured to receive the sensor data 220 and compare the sensor data 220 to the criteria 224 for use in determining whether a defect is predicted and/or the cause of defect.

The first defect, waiting mat defect, may be caused in instances where the screed assembly 128 is floating (screed float on), the material feed is off (e.g., paving material 118 is not being supplied to the auger assembly 122), and the paving machine 100 is not moving (e.g., stationary). Indications of such may be provided by the screed float sensor 150, the material feed sensor 156, and the speed sensor 154, respectively. A waiting mat defect occurs in instances where the paving material 118 is cooled while the paving machine 100 is stationary. Upon resuming paving, for example, the cooled paving material 118 mixes with other paving material 118 and when deposited, leads to a defect in the paving mat 108. For example, the cooled paving material 118 may not properly mix with the other paving material 118, creating an inconsistent paving mat 108.

The second defect, an auger chamber fill mat defect, may be caused in multiple instances. For example, the auger chamber fill mat defect may be caused where the material feed is auto, the screed assembly 128 is floating, a temperature of the hydraulic oil is greater than a threshold (e.g., 35° C.), the paving machine 100 is in pave mode, the screed heat is off, and the paving machine 100 is not moving (e.g., stationary). In another instance, the auger chamber fill mat defect is caused where the screed assembly 128 is floating, the material feed is manual, a temperature of the hydraulic oil is greater than a threshold (e.g., 35° C.), the paving machine 100 is in pave mode or maneuver mode, and the paving machine 100 is not moving (e.g., stationary). Still in some instances, the auger chamber fill mat defect may be caused where the screed assembly 128 is floating, the paving machine 100 is in pave mode, the screed heat is on, and the material feed is either auto or manual. Indications of such may be provided by the transmission, the screed float sensor 150, the screed heat sensor 206, the hydraulic oil temperature sensor 200, the material feed sensor 156, and the speed sensor 154. Filling the auger chamber while the paving machine 100 is not moving may cause segregation within the paving material 118. For example, the paving material 118 may continue to be supplied to the auger assembly 122, mixing the paving material 118, but being as the paving machine 100 is not moving, clumps of the paving material 118 form. When the paving machine 100 starts paving again, the collection of large aggregates do not compact well and allow air voids to form. These air voids can eventually fill with water and cause damage during freeze/thaw cycles.

The third defect, a paving finishing pull mat defect, may be caused where the hopper 116 is not activated, the screed float is off, the material feed is automatic, the paving machine 100 is in pave mode, and the paving machine 100 is moving. Indications of such may be provided by the transmission, the screed float sensor 150, the material feed sensor 156, the hopper activation sensor 158, and the speed sensor 154. With the paving finishing pull, the screed assembly 128 is no longer in float and the weight of the assembly 128 is being carried by the paving machine 100 instead of being transferred to the paving mat 108, or the paving material 118. Because this weight transfer is not taking place, the paving material 118 in the area of this defect is not being pre-compacted. The height of the paving material 118 surface is the same, but the density of the paving material 118 is less because of lack of pre-compaction. When a compactor compacts this paving material 118, a depression is created in the paving mat 108.

The fourth defect, material feed manual override while paving mat defect, may be caused in instances where the material feed is manual, the paving machine 100 is in pave mode, the hopper 116 is not activated, and the paving machine 100 is moving. Indications of such may be provided by the material feed sensor 156, the transmission, the hopper activation sensor 158, and the speed sensor 154. In some instances, the material feed manual override while paving mat defect may be caused regardless of whether the screed heat is on or off, and/or whether the screed float is on or off. In this manner, if the paving machine 100 is paving, moving, and the material feed is manual, the monitoring component 106 predicts a defect. Such defect may be, for example, a result of an inconsistent or insufficient amount of paving material being supplied to the auger assembly 122. This may cause bumps in the paving mat 108 (e.g., uneven surface).

The fifth defect, hopper activation mat defect, may be caused in multiple instances where the hopper 116 is activated. For example, the hopper activation mat defect may be caused in instances where the paving machine 100 is in pave mode, the paving machine 100 is moving, the hopper 116 is activated, and except for when the material feed is off and the screed float is off. Indications of such may be provided by the material feed sensor 156, the speed sensor 154, the hopper activation sensor 158, the screed float sensor 150, and the screed heat sensor 206. Here, activating the hopper 116 results in cooled paving material mixing with other paving material. As a result, the colder paving material may not mix properly with the paving material, causing an inconsistent density in the paving mat 108.

The monitoring component 106 is therefore configured to receive the sensor data 220 from the controller 144 and map the sensor data 220 (or information associated therewith) to the criteria 224 in the defect database 226 to determine whether a defect is predicted, as well as the type or cause of the defect. In some instances, the computing device(s) 102 have a comparison component 228 that compares the sensor data 220 to the criteria 224 for determining whether a defect is predicted, and if predicted, the type of defect. In instances where the monitoring component 106 predicts a defect, a location of the predicted defect is recorded, as well as the type of defect, such as within the defect database 226 as defect locations 230. In some instances, the locations of the defects are determined, at least in part, by the communication device 136 (or associated sensor data). That is, after the monitoring component 106 predicts a defect, that defect is stored in association with a location of the paving machine 100. Such location information is used for one or more post-paving operations for inspecting the paving mat 108. Additionally, or alternatively, the monitoring component 106 generates and provides notifications 232 that indicate the locations of the defects, as well as the type of defect, along a route the paving machine 100 travels. This allows operators of the paving machine 100 to observe the defects (e.g., via the control interface 134) in real-time for assessing a quality of the paving mat 108 and/or a productivity of the paving machine 100. In doing so, the operator of the paving machine 100 may make adjustments to reduce the number of defects and/or the notifications 232 may be used for training purposes, such as how to properly operate the paving machine 100.

In some examples, the computing device(s) 102 may include one or more machine-learned model(s) 208 that are configured to perform tasks related to defect identification using the sensor data 220, a defect type identification, and so forth. For instance, the monitoring component 106 may utilize a machine-learned model(s) 208 to predict paving mat defects. In some instances, as part of predicting the paving mat defects, the machine-learned model(s) 208 associates the sensor data 220 with determining paving mat defects (e.g., ambient temperature, speed of the paving machine, screed assembly height, and so forth). Example machine-learned model(s) 208 may include a regression algorithm (e.g., ordinary least squares regression (OLSR), linear regression, logistic regression, stepwise regression, multivariate adaptive regression splines (MARS), locally estimated scatterplot smoothing (LOESS)), a decision tree algorithm (e.g., classification and regression tree (CART), iterative dichotomiser 3 (ID3), Chi-squared automatic interaction detection (CHAID), decision stump, conditional decision trees), or other machine-learning algorithm to determine which remedies apply to which defects, an order of how to apply different remedies to resolve a defect, which remedies to apply in combination to resolve a defect, and so forth.

In some instances, the machine-learned model(s) 208 are part of a neural network, which is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. Further, although discussed in the context of neural networks, any type of machine learning can be used consistent with this disclosure. Beyond those just described, machine learning algorithms can include, but are not limited to, instance-based algorithms (e.g., ridge regression, least absolute shrinkage and selection operator (LASSO), elastic net, least-angle regression (LARS)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

It is to be understood that the monitoring component 106, or more generally the computing device(s) 102, continuously receive the sensor data 220 for use in predicting defects in the paving mat 108 throughout a paving operation at a worksite. Moreover, the monitoring component 106 may utilize multiple instances of the sensor data 220 to identify a paving mat defect. In other words, the monitoring component 106 receives the sensor data 220 from different types of sensors. Additionally, or alternatively, the monitoring component 106 may rely on multiple instances of a same type of sensor data 220 to predict a paving mat defect.

In some instances, the monitoring component 106 stores the sensor data 220 received from the sensors of the paving machine 100 in association with identified paving mat defects and known defect types in the defect database 226. In this way, the defect database 226 grows to accommodate sensor data received in different conditions, at different times of day, using different paving materials, and so forth, and thus the monitoring component 106 becomes more accurate at identifying paving mat defects. The monitoring component 106, the defect database 226, the comparison component 228, and the machine-learned models are shown residing in memory 204 of the computing device(s) 102.

The paving machine 100 includes additional components not specifically mentioned. For example, the paving machine 100 may include hydraulic components such as one or more hydraulic pumps, oil pumps, coolant pumps, and/or other hydraulic components configured to provide desired functionality to the paving machine 100. Such hydraulic components include one or more hydraulic cylinders, hydraulic actuators, propulsion pumps, one or more pumps connected to the auger assembly 122, one or more pumps connected to the conveyor system 120, one or more tamper bar pumps, one or more fan pumps, and/or one or more additional pumps connected to a moveable component of the paving machine 100. In any of the examples described herein, the hydraulic pump, oil pump, coolant pump, and/or any of the other hydraulic components couple to, are driven by, and/or otherwise connected to a power source of the paving machine 100.

Although shown as residing at the computing device(s) 102, the monitoring component 106 as well as other data, components, and so forth stored in the memory 204 may be stored locally at the paving machine 100. In such instances, the paving machine 100 may include the monitoring component 106, as well as the defect database 226, for example, stored in memory for determining the defects in the paving mat 108. In such instances, processing may occur locally at the paving machine 100. However, processing may be divided between the paving machine 100 and the computing device(s) 102 based on demand, load, and computation capacity.

Additionally, although not shown, the paving machine 100 may include one or more modules, such as an engine module, machine module, or a transmission module for determining operational statuses of the various components of the paving machine 100. The modules serve to control various circuitry of the paving machine 100 which causes various components of the paving machine 100 to activate. For example, the modules control whether the hopper 116 is activated, whether the screed heat is on, whether the screed assembly 128 is floating, whether the transmission is in park, drive mode, etc., how the paving material 118 is supplied, and so forth. As an example, the modules provide indications of statuses of the components based on whether voltages or current are being supplied to such components, or commands transmitted to the components that control their respective operations. In other words, the modules are utilized to determine the statuses of various components of the paving machine 100, such as whether the components are activated or a certain state of activation.

Furthermore, the paving machine 100 and/or the computing device(s) 102 may communicatively couple to additional device(s) via the network 104. For example, a paving material plant may generate ticketing data that indicates paving material prepared for the paving operation. The ticketing data indicates a weight of the paving material, a time the paving material was prepared, a temperature of the paving material, and so forth. Such information may be utilized by the monitoring component 106 to determine the productivity of the paving operation. Moreover, the monitoring component 106 may receive data from haul trucks that transport the paving material from the paving material plant to a worksite. Such information includes, for example, a location of the haul trucks and/or a speed of the haul trucks. Using this information, the monitoring component 106 may predict paving mat defects.

The paving machine 100 therefore include a plurality of sensor(s) for generating sensor data to be used by the computing device(s) 102, or components thereof, for predicting defects in the paving mat 108. The computing device(s) 102 are configured to compare the sensor data against criteria 224 associated with the defects for predicting an occurrence of the defect. In instances were defects are predicted, notifications of such are provided, or displayed, on the control interface 134 of the paving machine 100.

Figure 3:
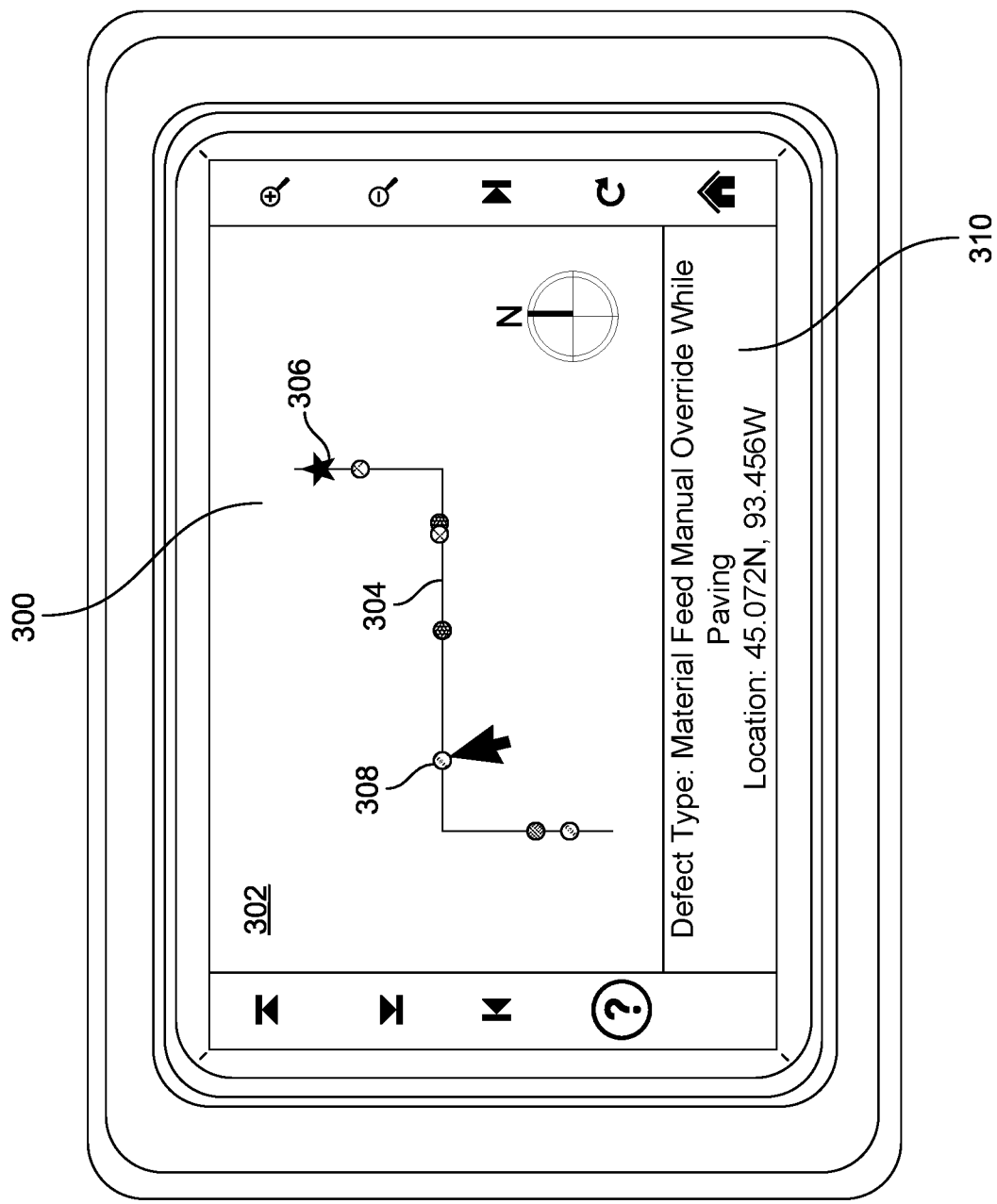
FIG. 3 is an example illustration of a user interface presented on a control interface of a paving machine, in accordance with an example of the present disclosure.

FIG. 3 is an illustration of an example user interface 300 generated by the controller 144 of the paving machine 100 for presenting the paving mat defects as determined by the monitoring component 106. The user interface 300 may be presented on the control interface 134 at the paving machine 100.

The user interface 300 includes, for example, a map 302 illustrating at least part of an example travel path 304 of the paving machine 100. In some instances, the map 302 provided by the user interface 300 includes one or more images, icons, markers, identifiers, and/or other visual indicia associated with the worksite, a route taken along the travel path 304 by the paving machine 100, a location 306 of the paving machine 100, and so forth. The user interface 300 also presents indicia of various predicted paving mat defects. For example, in instances where the monitoring component 106 predicts a defect in the paving mat 108, the controller 144 receives the notification 232 of such and displays, on the control interface 134, the indicia. In some instances, the indicia of the defect is displayed along the travel path 304 at a location in which the paving mat defect is located. This allows an operator of the paving machine 100, for example, to visually observe where along the travel path 304 the defects are predicted.

In some instances, the indicia is selected (e.g., clicked, highlighted, etc.) for providing information as to a type of the defect in the paving mat 108. For example, the operator may hover over or select an indicia 308 associated with a defect in the paving mat 108. Therein, the user interface 300 displays the type of defect and/or the location of the defect within a portion 310 of the user interface 300. In some instances, the user interface 300 also displays a time at which the defect occurred, a speed of the paving machine 100, a temperature of the paving material 118, and/or other information associated with the defect.

In some instances, the indicia of the defects are color coordinated or include different representations to allow the operator to filter or visually observe the types of defects. For example, a first indicia for a hopper activation while waiting defect includes a first color, a second indicia for a hopper activation during auger chamber fill includes a second color, and so forth. In some instances, the user interface 300 presents the operator with filtering menus (e.g., drop-down menus) for sorting the defects by type, frequency, location, occurrence, and so forth.

The control interface 134 therefore presents user interfaces that visually depict a paving operation, locations of the defects, and characteristics of the defects, such as type. This allows operators of the paving machine 100 to alter setting(s) of the paving machine 100. Additionally, displaying the defects allows for the observation of a productivity of the paving machine 100, which in some instances, is used to further determine paving mat defects and/or for training purposes.

Figure 4:
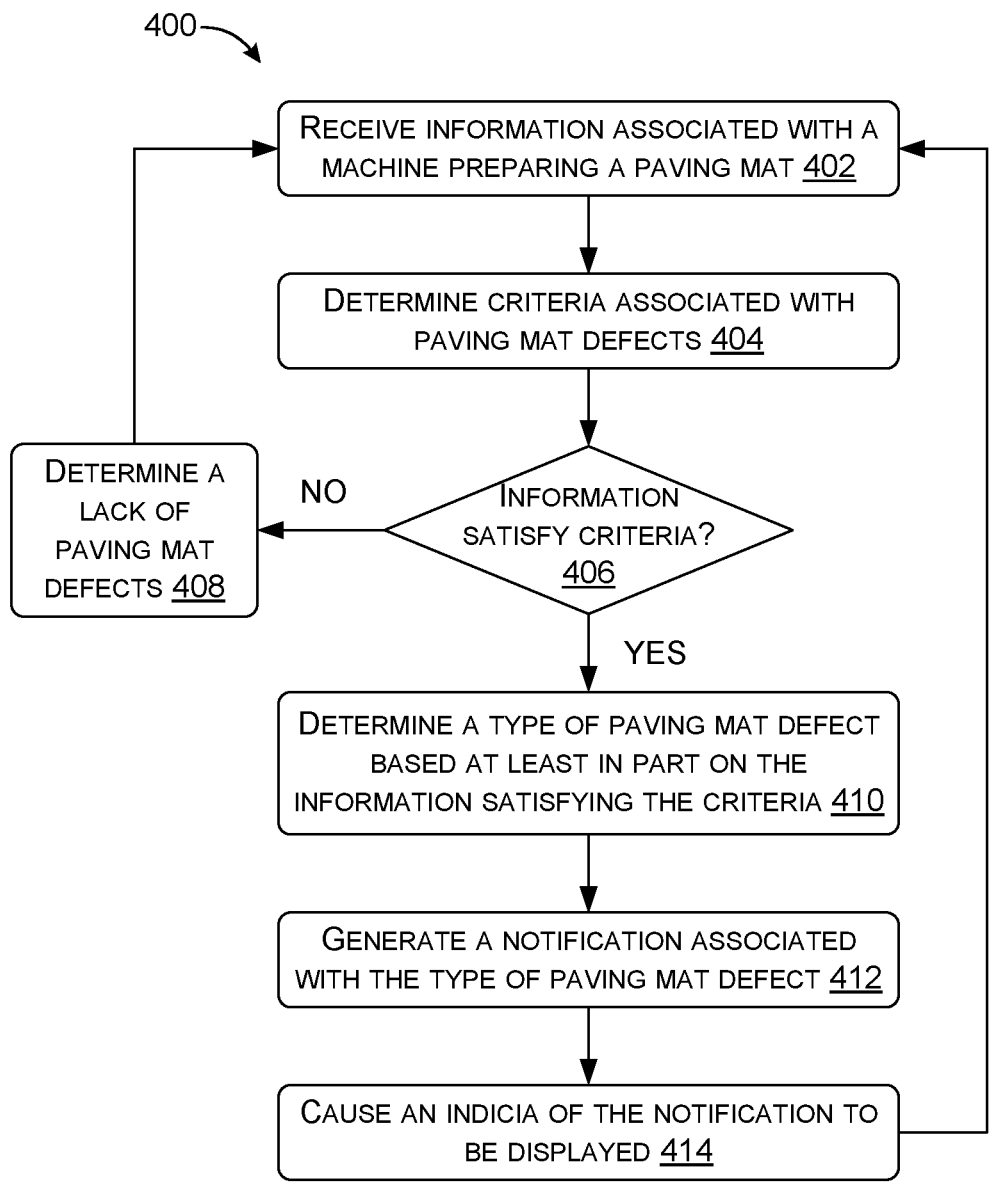
FIG. 4 is a flow chart depicting an example method for predicting a defect in a paving mat and displaying a notification of the defect, in accordance with an example of the present disclosure.
Figure 5:
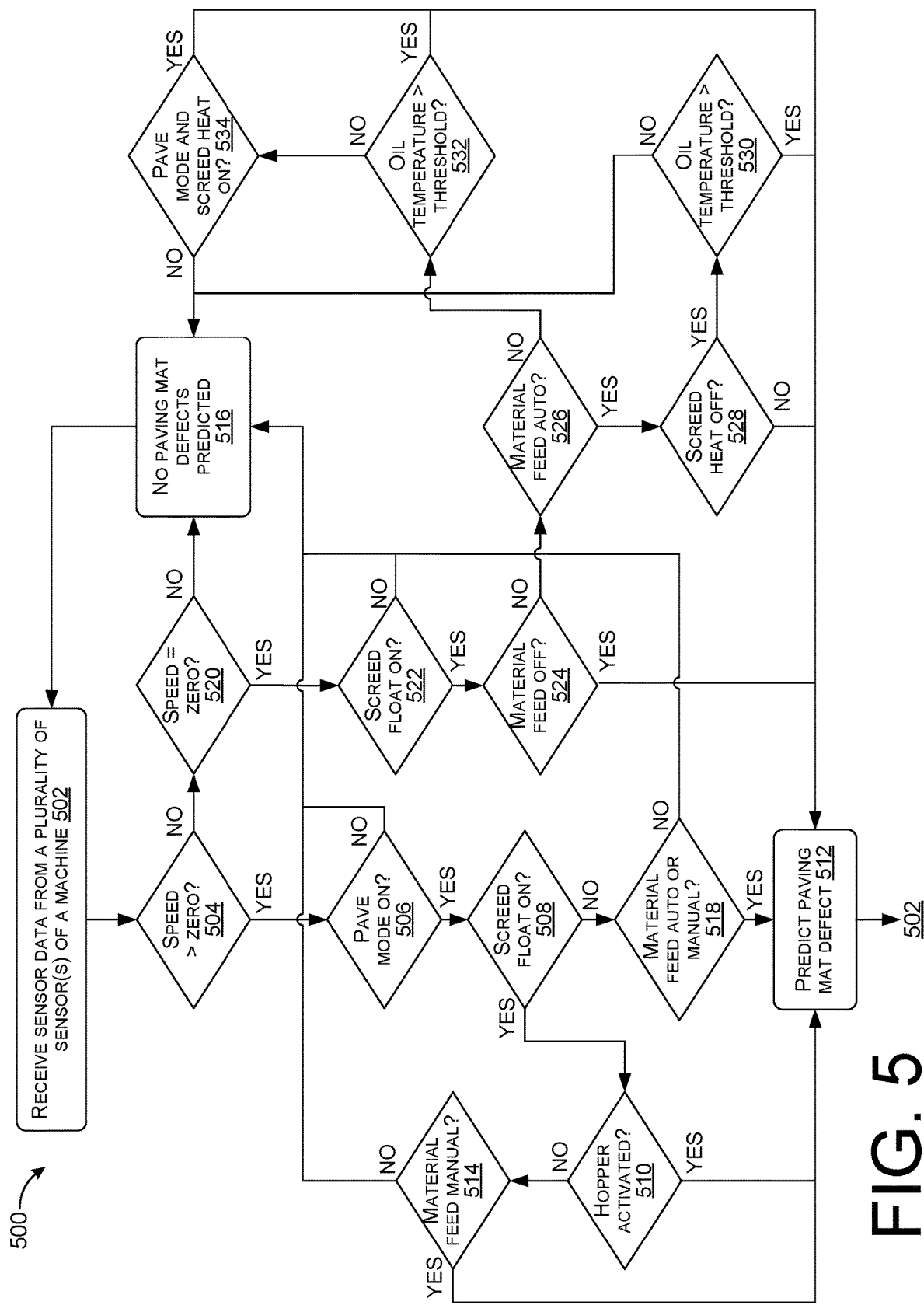
FIG. 5 is a flow chart depicting an example method for predicting a defect in a paving mat, in accordance with an example of the present disclosure.

FIGS. 4 and 5 illustrate various processes related to predicting defects within the paving mat 108. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, although the processes may be implemented in a wide variety of other environments, architectures and systems.

FIG. 4 illustrates an example process 400 for determining defects within the paving mat 108. In some instances, the process 400 is performed by the computing device(s) 102 or components thereof, such as the monitoring component 106.

At 402, the monitoring component 106 receives information associated with a machine preparing a paving mat. For example, the monitoring component 106 receives, from the controller 144, the sensor data 220 via the network 104. The sensor data 220 is generated by various sensors of the paving machine 100 (as discussed above), and the controller 144 transmits the sensor data 220 automatically and/or according to predetermined schedules, intervals, requests, and so forth. By way of example, the sensor data 220 may indicate whether the paving machine 100 is in pave mode, whether the hopper 116 of the paving machine 100 is activated, whether the screed assembly 128 is floating, and so forth. Generally, the sensor data 220 indicates a status of the paving machine 100 (e.g., configurations), or a status of components of the paving machine 100, operational parameters of the paving machine 100 (e.g., material feed), and/or worksite conditions (e.g., temperature).

At 404, the monitoring component 106 determines criteria associated with paving mat defects. The monitoring component 106 determines the criteria 224 via accessing the defect database 226. As discussed above, the criteria 224 is associated with respective defects in the paving mat 108. Thus, to know whether defects are in the paving mat 108, the monitoring component 106 accesses the criteria 224 for use in comparison against the information to determine whether one or more defects are present in the paving mat 108. In some instances, the criteria 224 is associated with whether the hopper 116 is activated, whether the screed assembly 128 is floating, whether the ground-engaging elements 112 are moving, whether the auger assembly 122 is actuated, and so forth.

At 406, the monitoring component 106 determines whether the information satisfies the criteria. For example, the monitoring component 106 may compare the information received from the controller 144 of the paving machine 100 (at 402) to determine whether the information satisfies (e.g., matches) the criteria 224. In some instances, this involves the monitoring component 106 processing, in parallel or sequentially, the sensor data 220 and comparing the sensor data 220 to the criteria 224 associated with each of the paving mat defects. As discussed herein, such processing may be performed in real-time for providing substantially instantaneous feedback for informing the operation of potential defects in the paving mat 108. This allows the operator to adjust a configuration or settings of the paving machine 100 to reduce the defects in the paving mat 108 and increase productivity. In some instances, more than one paving mat defect may be predicted to occur, whether at the same time, the same location, or both. For example, a waiting mat defect and an auger chamber fill mat defect may occur at the same location, at different times, whereas a hopper activation mat defect and a paving finishing pull mat defect may occur at the same location and at the same time.

As a brief example, the criteria 224 for a waiting mat defect includes criteria of: (1) screed float on, (2) material feed off, and (3) stationary (e.g., not moving). The monitoring component 106, via the sensor data 220, may determine whether the sensor data 220 indicates whether the screed float is on, whether the material feed is off, and whether the paving machine 100 is stationary. If all of these criteria are satisfied, the monitoring component 106 determines that the information satisfies the criteria 224 for the waiting mat defect. If the criteria is not satisfied, the monitoring component 106 may compare the sensor data 220 to criteria of another defect, such as hoper activation defect. Such comparison may be performed sequentially or in parallel to provide substantially instantaneous feedback regarding the productivity of the paving machine 100.

In some instances, the criteria 224 associated with the defects may be determined as laid out below in the following table.

TABLE 1

| Criteria for Paving Mat Defects |
|---|
| Defect: Waiting Mat Defect |
| Criteria |
| Screed Float ON |
| Material Feed OFF |
| Speed = ZERO |
| Defect: Auger Chamber Fill Mat Defect |
| Criteria (1) |
| Screed Heat OFF |
| Hydraulic Oil Temperature > Threshold |
| Screed Float ON |
| Material Feed AUTO |
| Speed = ZERO |
| Pave Mode = ON |
| Criteria (2) |
| Screed Heat ON |
| Screed Float ON |
| Material Feed AUTO or MANUAL |
| Speed = ZERO |
| Pave Mode = ON |
| Criteria (3) |
| Screed Float ON |
| Material Feed MANUAL |
| Speed = ZERO |
| Hydraulic Oil Temperature > Threshold |
| Defect: Paving Finish Pull Mat Defect |
| Criteria |
| Hopper Deactivated |
| Screed Float OFF |
| Material Feed AUTO |
| Speed > ZERO |
| Defect: Material Feed Manual Override While Paving |
| Criteria (1) |
| Material Feed MANUAL |
| Speed > ZERO |
| Pave Mode = ON |
| Screed Float OFF |
| Criteria (2) |
| Material Feed MANUAL |
| Speed > ZERO |
| Pave Mode = ON |
| Screed Float ON |
| Defect: Hopper Activation Mat Defect |

TABLE 1-continued

| Criteria for Paving Mat Defects |
|---|
| Criteria (1) |
| Hopper Activated |
| Screed Float OFF |
| Material Feed AUTO |
| Speed > ZERO |
| Pave Mode = ON |
| Criteria (2) |
| Hopper Activated |
| Screed Float OFF |
| Material Feed MANUAL |
| Speed > ZERO |
| Pave Mode = ON |
| Criteria (3) |
| Hopper Activated |
| Screed Float ON |
| Material Feed OFF |
| Speed > ZERO |
| Pave Mode = ON |
| Criteria (4) |
| Hopper Activated |
| Screed Float ON |
| Material Feed AUTO |
| Speed > ZERO |
| Pave Mode = ON |
| Screed Heat OFF |
| Criteria (5) |
| Hopper Activated |
| Screed Float ON |
| Material Feed AUTO |
| Speed > ZERO |
| Pave Mode = ON |
| Screed Heat ON |
| Criteria (6) |
| Hopper Activated |
| Screed Float ON |
| Material Feed MANUAL |
| Speed > ZERO |
| Pave Mode = ON |

As such, using the sensor data 220, the monitoring component 106 determines the type of defect predicted to occur within the paving mat 108.

If the information does not satisfy the criteria at 406, the monitoring component 106 at 408, determines a lack of paving mat defects in the paving mat 108 ("NO" route following 406). From 408 the process 400 loops to 402 to continue to receive information associated with the paving machine 100 for determining defects. Alternatively, if the information satisfies the criteria at 406, the monitoring component 106 determines a type of paving mat defect at 410 based at least in part on the information satisfying the criteria 224 ("YES" route from 406). For example, based on a comparison of the information to the criteria, the monitoring component 106 determines which criteria 224 the information satisfies. In turn, the monitoring component 106 determines the type of defect.

At 412, the monitoring component 106 generates a notification associated with the type of paving mat defect. For example, as part of determining the defect in the paving mat 108, the monitoring component 106 determines the type of defect. In some instances, the monitoring component 106 also determines a location associated with the defect.

At 414, the monitoring component 106 causes an indicia of the notification to be displayed. For example, the monitoring component 106 causes the control interface 134 to display the indicia of the paving mat defect. This allows an operator to visually observe the paving mat defect along a travel route of the paving machine 100 for use in post-application process, training, adjusting setting(s) of the paving machine 100, and so forth.

In some instances, and as noted above, determining whether the criteria 224 is satisfied for the paving mat defects may be based at least in part on indications received from various modules of the paving machine 100. In such instances, the monitoring component 106 may, or may not, receive the sensor data 220 for determining the paving mat defects. Rather, the monitoring component 106 may receive indications from various modules communicatively coupled to, or controlling, the components of the paving machine 100 (e.g., engine, the auger assembly 122, the screed assembly 128, etc.). The modules provide indications of how components are being controlled (e.g., based on instructions transmitted by the modules), an operational status of the components, and/or whether the components are operational. Such indications therefore are provided to controller 144 for knowing the material feed status, screed float status, hopper activation status, and so forth.

As such, the process 400 performed by the monitoring component 106 receives the sensor data 220 for various sensors of the paving machine 100, compares the sensor data 220 to criteria 224 associated with paving mat defects, and determines whether paving mat defects are present. Such process may be performed in real-time and as the paving machine 100 is preparing a paving surface. This allows the paving machine 100 to operate continuously and increase productivity. In instances where paving mat defects are determined, notifications of such are presented to an operator of the paving machine and/or other personnel.

FIG. 5 illustrates an example process 500 for determining defects within the paving mat 108. In some instances, the process 500 may be performed by the computing device(s) 102 or components thereof, such as the monitoring component 106.

At 502, the monitoring component 106 receives sensor data 220 from a plurality of sensor(s) of a machine. For example, the monitoring component 106 may receive, from the controller 144, the sensor data 220 via the network 104. The sensor data 220 is generated by various sensors of the machine, and the controller 144 transmits the sensor data 220 according to predetermined schedules, intervals, requests, and so forth. As an example, the sensor data 220 indicates whether the machine is in pave mode, whether the hopper 116 of the machine is activated, whether the screed assembly 128 is floating, and so forth.

At 504, the monitoring component 106 determines whether a speed of the machine is greater than zero. For example, the monitoring component 106 determines, via the sensor data 220, whether the machine is moving or stationary (e.g., parked, braked, etc.). In some instances, the sensor data 220 includes data generated via the speed sensor 154. If the monitoring component 106 at 504 determines that the speed of the machine is greater than zero, the monitoring component 106 determines, at 506, whether the machine is in pave mode ("YES" route from 504). For example, the monitoring component 106, via the sensor data 220, may determine whether the machine is preparing the paving mat 108. In some instances, whether the machine is in pave mode is determined via the auger assembly 122, the conveyor system 120, the screed assembly 128, the heating system 218, and so forth being activated (e.g., powered on).

If at 506 the monitoring component 106 determines that the machine is in pave mode, the monitoring component 106 determines, at 508, whether the screed float is on ("YES" route from 504). For example, the monitoring component 106 may determine, via the sensor data 220 generated by the screed float sensor 150, whether the screed assembly 128 is floating. Whether the screed assembly 128 is floating may be determined via circuity that powers or otherwise controls the screed assembly 128. If the monitoring component 106 at 508 determines that the screed assembly 128 is floating, the monitoring component 106, at 510, determines whether the hopper 116 is activated ("YES" route from 508).

For example, the monitoring component 106 determines whether the hopper 116 is activated to funnel the paving material 118 into the conveyor system 120. The monitoring component 106 may determine, via the sensor data 220 generated by the hopper activation sensor 158, whether the hopper 116 is activated. Additionally, or alternatively, whether the hopper 116 is activated may be determined via circuity that powers or otherwise controls the hopper 116 (or hydraulic components coupled to the hopper 116). If the monitoring component 106 determines that the hopper 116 is activated, the monitoring component 106 predicts a paving mat defects at 512 ("YES" route from 510).

At 512, the monitoring component 106 determines the type of paving mat defect, for example, based on comparing the criteria 224 of the paving mat defects to the information represented within the sensor data 220. From 512, the monitoring component 106, at 502, continues to receive the sensor data 220 for use in determining whether the machine is preparing the paving mat 108 with predicted defects.

Alternatively, if at 510 the monitoring component 106 determines that the hopper 116 is not activated, the monitoring component 106 determines whether the material feed is manual at 514 ("NO" route from 510). For example, the monitoring component 106 determines whether, and how, the paving material 118 is being supplied to the auger assembly 122 or whether the conveyor system 120 is operational. That is, the conveyor system 120 may be controlled manually by an operator of the machine for delivering the paving material 118 to the auger assembly 122, the screed assembly 128, and so forth. In other examples, the conveyor system 120 is automatically controlled (e.g., via the controller 144) for delivering the paving material 118. In other instances, the conveyor system 120 is powered off, so as to not deliver the paving material 118. As such, at 514, the monitoring component 106 determines how the paving material 118 is supplied.

If the monitoring component 106 determines that the operator is manually controlling the conveyor system 120, the monitoring component 106 predicts a paving mat defect at 512 ("YES" route from 514). That is, if the paving material 118 is supplied manually, through manual adjustments or controls of the operator, the monitoring component 106 predicts a defect in the paving mat 108. Alternatively, if at 514 the monitoring component 106 determines that the paving material 118 is not being supplied manually, such as autonomously, the monitoring component 106, at 516, determines that no paving mat defects are predicted ("NO" route from 514). From 516, the monitoring component 106, at 502, continues to receive the sensor data for use in determining paving mat defects.

Returning to 508, if the monitoring component 106 determines that the screed float is off, the monitoring component 106 at 518 determines whether the material feed is auto or manual ("NO" route from 508). For example, the monitoring component 106 may determine how the paving material 118 is being supplied to the auger assembly 122 and/or the screed assembly 128. This includes a determination of whether the paving material 118 is supplied manually or automatically, or whether the conveyor system 120 is off. If the monitoring component 106 determines that the paving material 118 is being supplied autonomously or manually, the monitoring component 106 predicts a paving mat defects at 512 ("YES" route from 518). Conversely, if the monitoring component 106 determines that the paving material 118 is not being supplied autonomously or manually, such that the material feed is off, the monitoring component 106 predicts no paving mat defect at 516 ("NO" route from 518).

Returning to 506, if at 506 the monitoring component 106 determines that the machine is not in pave mode, the monitoring component 106, at 516, determines that no paving mat defects are predicted ("NO" route from 506).

Returning to 504, if the monitoring component 106 determines that the speed is not greater than zero, such as the machine being stationary, the monitoring component 106 at 520 determines whether the speed of the machine is equal to zero ("NO" route from 504). If the monitoring component 106 determines that the speed is equal to zero, the monitoring component 106 may predict no paving mat defects at 516 ("NO" route from 520). Comparatively, if the monitoring component 106 determines that the speed is equal to zero, the monitoring component 106 at 522 determines whether the screed float is on ("YES" route from 520). At 522, the monitoring component 106 may access the sensor data 220 to determine whether the screed float is on. For example, using the sensor data 220, the monitoring component 106 determines whether the screed assembly 128 is floating. If the monitoring component 106 determines that the screed assembly 128 is not floating, the monitoring component 106 predicts no paving mat defects at 516 ("YES" route from 522). Alternatively, if the screed assembly 128 is floating, the monitoring component 106 determines, at 524, whether the material feed is off.

For example, the monitoring component 106 determines how the paving material 118 is being supplied to the auger assembly 122 and/or the screed assembly 128. This includes a determination of whether the paving material 118 is supplied manually, automatically, or whether the conveyor system 120 is off. If the monitoring component 106 determines that the conveyor system 120 is powered off, or that the conveyor system 120 is not supplying the paving material 118 autonomously, the monitoring component 106 predicts a paving mat defect at 512 ("YES" route from 524). Conversely, if the monitoring component 106 determines that the material feed is not off, the monitoring component 106 determines at 526 whether the material feed is auto ("NO" route from 524). If the monitoring component 106 determines that the material feed is autonomous, the monitoring component 106 determines whether the screed heat is off at 528 ("YES" route from 526). For example, the sensor data 220 may include data generated by the screed heat sensor 206, which indicates whether the heating system 218 is heating the paving material 118 in the screed assembly 128, or whether the screed assembly 128 is being heated. If the monitoring component 106 determines that the screed heat is on, the monitoring component 106 predicts paving mat defects at 512 ("NO" route from 528). Alternatively, if at 528 the monitoring component 106 determines that the screed heat is off, the monitoring component 106 determines at 530 whether a hydraulic oil temperature is greater than a threshold ("YES" route from 528). For example, the monitoring component 106 may access the sensor data 220 to determine whether the hydraulic oil temperature is greater than a threshold. In some instances, the threshold temperature may be substantially or approximately 35° C. For example, using the sensor data 220 generated by the hydraulic oil temperature sensor 200, the monitoring component 106 determines whether the hydraulic oil temperature is greater than 35° C. If the monitoring component 106 determines that the hydraulic oil temperature is not greater than the threshold, the monitoring component 106 predicts no paving mat defects at 516 ("NO" route from 530). Alternatively, if the monitoring component 106 determines that the oil temperature is greater than the threshold, the monitoring component 106 predicts a paving mat defect at 512 ("YES" route from 530).

Returning to 526, if the monitoring component 106 determines that the material feed is not autonomous, the monitoring component 106 determines whether the hydraulic oil temperature is greater than a threshold at 532 ("NO" route from 526). If the monitoring component 106 determines that the hydraulic oil temperature is greater than the threshold (e.g., 35° C.), the monitoring component 106 predicts a paving mat defect at 512 ("YES" route from 532). Alternatively, if the monitoring component 106 determines that the hydraulic oil temperature is not greater than the threshold, the monitoring component 106 determines whether the machine is in pave mode and whether the screed heat is on at 534 ("NO" route from 532). For example, the sensor data 220 may include data generated by the screed heat sensor 206, which indicates whether the heating system 218 is heating the paving material 118 in the screed assembly 128, or whether the screed assembly 128 is being heated. The monitoring component 106 may determine, via the sensor data 220, whether the machine is preparing the paving mat 108. If the monitoring component 106 determines that the machine is not in pave mode and the screed heat is not on, the monitoring component 106 may determine that no paving mat defects are predicted at 516 ("NO" route from 534). Alternatively, the monitoring component predicts at paving mat defect at 512 ("YES" route from 534).

As such, the process 500 performed by the monitoring component 106 receives the sensor data 220 for various sensors of the machine and, using the sensor data 220, predicts whether paving defects will occur. In some instances, this involves the monitoring component 106 determining whether various components of the machine are activated, as well as operational states (e.g., screed float on). Such determination allow for the sensor data 220 to be mapped to criteria associated with predicting the paving mat defects.

Industrial Applicability

The present disclosure provides systems and methods for predicting defects associated with a paving mat 108 of paving material 118 at a worksite. Such systems and methods are used to achieve improved paving and compacting performance by predicting mat defects earlier and with greater accuracy. Additionally, such systems and methods are used to improve efficiencies by not having to rely upon paving operators who are inexperienced with the variety of defects that occur and how to resolve such defects. For example, the system and methods may determine a type of defect associated with the paving mat 108. This allows for the specific type of defect to be determined, and as such, the cause of the defects in the paving mat 108 may be determined.

As part of this process, each of the defects are associated with criteria, or conditions that when satisfied, result in a predicted defect. Sensor data generated by a plurality of sensors at the paving machine are continuously monitored by a monitoring component 106 to determine whether data represented within the sensor data satisfies the criteria. Example criteria include, for example, a speed of the paving machine 100, whether a screed assembly 128 is floating, whether a hopper 116 is activated, how the paving material 118 is fed to the screed assembly 128, and so forth. By analyzing these conditions, the monitoring component 106 predicts a type of defect. In turn, the type of defect allows for a root cause to be determined, such as whether the operator activated the hopper 116 after a period of waiting.

By comparing the sensor data 220 with known criteria for different defect types, defects are arcuately determined and are remedied more accurately and efficiently than previous techniques. This increases a productivity of the paving machine 100. For example, indicating the type of defect allows operators to take corrective actions, such as changing a setting of the paving machine 100, to remedy the detected defect. Thus, the example systems and methods described above also provide considerable cost savings, and reduce the time and labor required for various paving activities at the worksite.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
    causing, by one or more controllers, a paving machine to form a paving mat of paving material on a surface of a worksite;
    receiving, by the one or more controllers, sensor data:
        associated with the paving mat, and
        collected in real time during formation of the paving mat;
    determining, by the one or more controllers and based at least in part on paving defect prediction criteria associated with preparing paving mats, first criteria associated with a first type of paving mat defect;
    determining, by the one or more controllers and based at least in part on the paving defect prediction criteria, second criteria associated with a second type of paving mat defect different from the first type of paving mat defect;
    determining, by the one or more controllers and based at least in part on the sensor data, whether the first criteria associated with the first type of paving mat defect is satisfied;
    determining, by the one or more controllers and based at least in part on the sensor data, whether the second criteria associated with the second type of paving mat defect is satisfied;
    determining, by the one or more controllers, in real time during formation of the paving mat, and based at least in part on whether the first criteria is satisfied or whether the second criteria is satisfied, that at least one of the first type of paving mat defect or the second type of paving mat defect is present in the paving mat;
    generating, by the one or more controllers, a notification indicating the at least one of the first type of paving mat defect or the second type of paving mat defect is present in the paving mat;
    causing, by the one or more controllers and during formation of the paving mat, the notification to be displayed via a control interface of the paving machine;
    receiving, by the one or more controllers, a signal from a component of the paving machine, the component:
        receiving a manual input based at least in part on the displayed notification, and
        providing the signal to the one or more controllers based at least in part on the input; and
    causing, by the one or more controllers, during formation of the paving mat, and based at least in part on the signal, a change in a setting of the paving machine associated with forming the at least one of the first type of paving mat defect or the second type of paving mat defect present in the paving mat.

2. The method of claim 1, wherein:
    the sensor data is received from one or more sensors of the paving machine, and
    causing the change in the setting of the paving machine at least partly remedies the at least one of the first type of paving mat defect or the second type of paving mat defect during formation of the paving mat.

3. The method of claim 1, wherein the notification is displayed substantially instantaneously, via the control interface, upon determining that the at least one of the first type of paving mat defect or the second type of paving mat defect is present in the paving mat.

4. The method of claim 1, wherein the sensor data indicates at least one of:
    an activation of a hopper of a machine;
    an activation of a screed heat element of the machine;
    a speed of the machine;
    a status of a paving material feed conveyor of the machine; or
    a status of a screed assembly of the machine.

5. The method of claim 1, further comprising:
    associating, by the one or more controllers and based at least in part on the sensor data, the first type of paving mat defect with a first location along a route associated with preparing the paving mat;
    associating, by the one or more controllers and based at least in part on the sensor data, the second type of paving mat defect with a second location along the route associated with preparing the paving mat; and
    causing, by the one or more controllers, the notification to be displayed via the control interface together with a map illustrating the route, first indicia indicating the first location along the route, and second indicia illustrating the second location along the route;
    wherein selection of the first indicia causes the control interface to display information indicating the first type of paving mat defect.

6. The method of claim 1, further comprising:
    determining, by the one or more controllers and based at least in part on the paving defect prediction criteria, third criteria associated with a third type of paving mat defect different from the first type of paving mat defect and the second type of paving mat defect;
    determining, by the one or more controllers and based at least in part on the sensor data, that the third criteria is unsatisfied; and
    determining, by the one or more controllers, an absence of the third type of the paving mat defect.

7. A system, comprising:
one or more sensing devices; and
one or more controllers in communication with the one or more sensing devices, the one or more controllers being configured to:
  receive, from the one or more sensing devices, sensor data:
    associated with a paving mat formed by a paving operation, and
    collected in real time during formation of the paving mat;
  determine criteria associated with a paving mat defect formed in the paving mat during the paving operation, the criteria including a first speed of a machine performing the paving operation, and a first paving material feed status of paving material at the machine;
  determine, based at least in part on the sensor data, a second speed of the machine and a second paving material feed status;
  determine that the second speed satisfies the first speed;
  determine that the second paving material feed status is the same as the first paving material feed status;
  determine, in real time during formation of the paving mat and based at least in part on the second speed satisfying the first speed and the second paving material feed status being the same as the first paving material feed status, that the criteria is satisfied;
  generate, based at least in part on determining that the criteria is satisfied, a notification indicating the paving mat defect formed in the paving mat;
  cause, during formation of the paving mat, the notification to be displayed via a control interface of the machine;
  receive a signal from a component of the machine, the component:
    receiving a manual input based at least in part on the displayed notification, and
    providing the signal based at least in part on the input; and
  cause, during formation of the paving mat and based at least in part on the signal, a change in a setting of the machine associated with forming the paving mat defect.

8. The system of claim 7, the one or more controllers being further configured to:
  determine a location of the paving mat defect based at least in part on the criteria being satisfied, and
  cause output of an indication associated with the location, via the control interface, together with the notification.

9. The system of claim 8, wherein:
  the indication is displayed in association with a travel route of the paving operation; and
  one or more additional paving mat defects are displayed in association with the travel route.

10. The system of claim 7, wherein the criteria further includes at least one of:
  a status of a hopper of the machine;
  a status of a screed assembly of the machine; or
  a heating status of the screed assembly.

11. The system of claim 10, the one or more controllers being further configured to determine, based on the sensor data and the criteria, that the criteria is satisfied.

12. The system of claim 7, wherein:
  the criteria associated with the paving mat defect comprises first criteria associated with a first paving mat defect, the one or more controllers being further configured to:
    determine second criteria associated with a second paving mat defect during the paving operation; and
    determine, in real time during formation of the paving mat and based at least in part on the sensor data, that the second criteria is satisfied.

13. The system of claim 12, wherein causing the change in the setting at least partly remedies the paving mat defect during formation of the paving mat; and
  causing the change in the setting comprises changing operation of at least one of:
    a hopper of the machine;
    a screed heat element of the machine;
    an engine of the machine;
    a paving material feed conveyor of the machine; or
    a screed assembly of the machine.

14. The system of claim 7, wherein the one or more sensing devices comprise at least one of:
  an imaging device;
  a tachometer;
  an infrared sensor;
  a LIDAR sensor; or
  a RADAR sensor.

15. The system of claim 7, the one or more controllers being further configured to:
  receive, from the one or more sensing devices, second sensor data; and
  determine, based at least in part on the second sensor data and the criteria, that the paving mat defect is absent.

16. A method, comprising:
  receiving, by one or more controllers and from a first sensor of a paving machine, first sensor data, the first sensor data being collected by the first sensor in real time during formation of a paving mat of paving material by the paving machine;
  receiving, by the one or more controllers and from a second sensor of the paving machine, second sensor data, the second sensor data being collected by the second sensor in real time during formation of the paving mat by the paving machine;
  determining, by the one or more controllers, criteria of a paving mat defect associated with the paving mat;
  determining, by the one or more controllers and based at least in part on the first sensor data, whether a first portion of the criteria is satisfied;
  determining, by the one or more controllers and based at least in part on the second sensor data, whether a second portion of the criteria is satisfied, the second portion being different than the first portion;
  determining, by the one or more controllers and in real time during formation of the paving mat, that the paving mat contains the paving mat defect based at least in part on the first portion of the criteria being satisfied and the second portion of the criteria being satisfied;
  generating, by the one or more controllers, a notification indicating that the paving mat contains the paving mat defect;
  causing, by the one or more controllers and during formation of the paving mat, the notification to be displayed via a control interface of the paving machine;
  receiving, by the one or more controllers, a signal from a component of the paving machine, the component:

receiving an input based at least in part on the displayed notification, and providing the signal based at least in part on the input; and causing, by the one or more controllers, during formation of the paving mat, and based at least in part on the signal, a change in a setting of the paving machine associated with forming the paving mat defect.

17. The method of claim 16, the notification indicating a type of defect associated with the paving mat defect and a location of the paving mat defect.

18. The method of claim 16, further comprising determining, by the one or more controllers, a cause of the paving mat defect based at least in part on the criteria, the first sensor data, and the second sensor data.

19. The method of claim 16, wherein the criteria comprises first criteria and the paving mat defect comprises a first paving mat defect, the method further comprising:

determining, by the one or more controllers, second criteria of a second paving mat defect, wherein the first paving mat defect comprises a first type of paving mat defect and the second paving mat defect comprises a second type of paving mat defect; and determining, by the one or more controllers, whether the paving mat contains the second paving mat defect based at least in part on comparing the sensor data to the second criteria.

20. The method of claim 16, wherein:

the criteria comprises at least one of:
 a speed of the paving machine;
 a status of a hopper of the paving machine;
 a status of a screed assembly of the paving machine;
 a heating status of the screed assembly; or
 a paving material feed status of paving material at the paving machine; and the sensor data is indicative of at least one of:
 the speed of the paving machine;
 the status of the hopper of the paving machine;
 the status of the screed assembly of the paving machine;
 the heating status of the screed assembly; or
 the paving material feed status of the paving material.

* * * * *